United States Patent
Loh (10) Patent No.: US 8,621,157 B2
(45) Date of Patent: Dec. 31, 2013

(54) CACHE PREFETCHING FROM NON-UNIFORM MEMORIES

(75) Inventor: Gabriel H. Loh, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 177 days.

(21) Appl. No.: 13/158,911

(22) Filed: Jun. 13, 2011

(65) Prior Publication Data

US 2012/0317364 A1    Dec. 13, 2012

(51) Int. Cl.
*G06F 12/00* (2006.01)
*G06F 13/00* (2006.01)
*G06F 13/28* (2006.01)

(52) U.S. Cl.
USPC .................................. 711/137; 711/E12.057

(58) Field of Classification Search
USPC ........................................ 711/137, E12.057
See application file for complete search history.

(56) References Cited

U.S. PATENT DOCUMENTS

| | | | |
|---|---|---|---|
| 4,933,837 A | 6/1990 | Freidin | |
| 5,765,214 A * | 6/1998 | Sywyk | 711/213 |
| 6,615,322 B2 | 9/2003 | Arimilli et al. | |
| 6,715,039 B1 | 3/2004 | Michael et al. | |
| 6,760,817 B2 | 7/2004 | Arimilli et al. | |
| 6,892,280 B2 | 5/2005 | Nakamura | |
| 7,340,567 B1 * | 3/2008 | Chou et al. | 711/137 |
| 8,176,251 B2 | 5/2012 | Bali et al. | |
| 8,347,036 B2 * | 1/2013 | Cargnoni et al. | 711/118 |
| 2002/0049889 A1 | 4/2002 | Hoogerbrugge et al. | |
| 2002/0107949 A1 | 8/2002 | Rawson | |
| 2002/0107955 A1 | 8/2002 | Rawson | |
| 2002/0156977 A1 | 10/2002 | Derrick et al. | |
| 2003/0088739 A1 | 5/2003 | Wilkes et al. | |
| 2003/0163649 A1 | 8/2003 | Kapur et al. | |
| 2003/0172236 A1 | 9/2003 | Iyengar et al. | |
| 2003/0177305 A1 | 9/2003 | Hetrick | |
| 2003/0177320 A1 | 9/2003 | Sah et al. | |
| 2003/0200388 A1 | 10/2003 | Hetrick | |
| 2004/0022094 A1 | 2/2004 | Radhakrishnan et al. | |
| 2004/0205298 A1 * | 10/2004 | Bearden et al. | 711/137 |
| 2005/0132140 A1 | 6/2005 | Burger et al. | |
| 2005/0268062 A1 * | 12/2005 | Nagase et al. | 711/167 |
| 2006/0224831 A1 * | 10/2006 | Yoshikawa | 711/137 |
| 2006/0259733 A1 | 11/2006 | Yamazaki et al. | |
| 2006/0268704 A1 | 11/2006 | Ansari et al. | |
| 2007/0156964 A1 | 7/2007 | Sistla | |
| 2007/0174562 A1 * | 7/2007 | Jeddeloh | 711/154 |

(Continued)

OTHER PUBLICATIONS

Homan Igehy, Matthew Eldridge, and Kekoa Proudfoot, "Prefetching in a Texture Cache Architecture," SIGGRAPH/Eurographics Workshop on Graphics Hardware, 1998, 11 pages.

(Continued)

*Primary Examiner* — Sheng-Jen Tsai (74) *Attorney, Agent, or Firm* — Meyertons, Hood, Kivlin, Kowert & Goetzel, P.C.; Michael B. Davis (57) ABSTRACT

An apparatus is disclosed for performing cache prefetching from non-uniform memories. The apparatus includes a processor configured to access multiple system memories with different respective performance characteristics. Each memory stores a respective subset of system memory data. The apparatus includes caching logic configured to determine a portion of the system memory to prefetch into the data cache. The caching logic determines the portion to prefetch based on one or more of the respective performance characteristics of the system memory that stores the portion of data.

17 Claims, 5 Drawing Sheets

(56) References Cited

U.S. PATENT DOCUMENTS

| | | | |
|---|---|---|---|
| 2007/0185933 A1* | 8/2007 | Dao et al. | 707/204 |
| 2008/0127131 A1* | 5/2008 | Gao et al. | 717/140 |
| 2008/0320228 A1 | 12/2008 | Brunheroto et al. | |
| 2009/0037660 A1 | 2/2009 | Fairhurst | |
| 2009/0198909 A1* | 8/2009 | Speight et al. | 711/137 |
| 2009/0199190 A1* | 8/2009 | Chen et al. | 718/102 |
| 2010/0262787 A1 | 10/2010 | Arimilli et al. | |
| 2011/0173395 A1 | 7/2011 | Bhattacharjee et al. | |
| 2012/0054445 A1 | 3/2012 | Swart et al. | |
| 2012/0054447 A1 | 3/2012 | Swart et al. | |

OTHER PUBLICATIONS

Jaeheon Jeong and Michel Dubois, "Cost-Sensitive Cache Replacement Algorithms," International Symposium on High-Performance Computer Architecture, 2003, 10 pages.

Jonathan D. Kron, Brooks Prumo, Gabriel H. Loh, "Double-DIP: Augmenting DIP with Adaptive Promotion Policies to Manage Shared L2 Caches," 2nd Workshop on Chip Multiprocessor Memory Systems and Interconnects (CMP-MSI), 2008, 9 pages.

Moinuddin K.Qureshi, Aamer Jaleel, Yale N. Patt, Simon C. Steely Jr., and Joel Emer, "Adaptive Insertion Policies for High-Performance Caching," International Symposium on Computer Architecture (ISCA), 2007, 11 pages.

Georgios Keramidas, Pavlos Petoumenos, and Stefanos Kaxiras, "Where Replacement Algorithms Fail: a Thorough Analysis," Proceedings of the 7th ACM international conference on Computing frontiers, 2010, 10 pages.

J. Jeong and M. Dubois, "Cache Replacement Algorithms with Non-uniform Miss Costs," IEEE Transactions on Computers, vol. 55, No. 4, pp. 353-365, Apr. 2006, 13 pages.

Jaeheon Jeong, Per Stenström and Michel Dubois, "Simple Penalty-Sensitive Cache Replacement Policies," Journal of Instruction-Level Parallelism 10, 2008, pp. 1-24.

* cited by examiner

CACHE PREFETCHING FROM NON-UNIFORM MEMORIES

BACKGROUND

To facilitate access to memory data, processors often include one or more small, fast memory caches to cache memory data that is likely to be needed again soon. When the processor needs to access memory, the processor first checks the data cache for the data and accesses main memory only if the required data is not in the cache. Thus, the processor may often avoid the performance penalty of accessing main memory.

Typically, caches are configured to store blocks of memory data that were accessed recently. If a processor accesses data stored at a given memory address, the cache may read a block of memory within which the address falls. The block may comprise a contiguous set of memory addresses, including the accessed address. Thus, the cache may leverage temporal and spatial locality properties of a memory access stream.

Some caches employ prefetching optimizations. A prefetching optimization uses a hardware and/or software prefetcher to cache blocks of memory data that have not yet been accessed and/or in response to the processor accessing memory data outside of those blocks. For example, in response to detecting that the processor is accessing the data in a given memory block sequentially, a prefetcher may predict that the sequential access pattern will continue onto the next memory block. In anticipation that the next memory block will be accessed, the prefetcher prefetches the next memory block into cache, even before that block is accessed. If the prefetching prediction is correct and the processor does subsequently access the next memory block, the prefetching will have hidden some or all of the latency associated with fetching the next memory block from main memory.

Traditional prefetch architectures sometimes include multiple requestors and an arbiter. Each prefetch requestor may employ a respective algorithm for generating prefetch requests in response to various events. The requests are queued by an arbiter, which then issues each prefetch to memory in the order received if memory resources are available and the request is still relevant.

Traditional prefetchers (requestors) attempt to increase performance by maximizing hit rates in the cache. For example, next-line prefetchers attempt to detect sequential access patterns and prefetch the next cache line. Stride-pattern prefetchers may detect more sophisticated access patters, which may span multiple memory blocks. For example, if the processor accesses every other memory block, a stride-pattern prefetcher may detect the pattern and prefetch accordingly. Other prefetchers may detect that a group of memory blocks are typically accessed together in close temporal proximity, and in response to detecting an access to one of the memory blocks, prefetch any number of the other memory blocks in the group.

SUMMARY OF EMBODIMENTS

An apparatus is disclosed for performing cache prefetching from non-uniform memories. The apparatus includes a processor configured to access multiple system memories with different respective performance characteristics, such as latency, bandwidth, power consumption, etc. Each memory stores a respective discrete subset of system memory data. The apparatus includes caching logic that is configured to determine a portion of the system memory to prefetch into the data cache based on one or more of the respective performance characteristics of the system memory that stores the portion of data.

In some embodiments, the caching logic may determine the portion of system memory to prefetch based on respective physical locations of the memories within the apparatus or based on different memory technologies used to implement the memories.

In some embodiments, the apparatus may include an arbiter that is configured to receive prefetch requests that target respective ones of the system memories. The arbiter may be configured to determine a next one of the requests to issue to a memory controller for execution. The arbiter may determine the next request based on one or more of the performance characteristics of the system memory that the request targets. For example, the arbiter may permit more in-flight prefetch requests targeting high-latency memory than low latency memory or more in-flight requests targeting high-bandwidth memory than targeting low-bandwidth memory.

In some embodiments, the apparatus may include a prefetcher configured to make prefetch requests according to a prefetching algorithm that is dependent on the respective performance characteristics of the memories. For example, the algorithm may make prefetch requests targeting high-latency memory more aggressively than it does requests targeting low latency memory, such as by triggering prefetch requests targeting the high-latency memory using a lower confidence threshold.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Traditional microprocessors use hardware and/or software prefetchers to bring data blocks into cache before those blocks are accessed. By prefetching data from memory before the processor requires it, prefetchers reduce the memory access penalty incurred by the processor.

Computer systems sometimes implement main memory using different instances and/or kinds of system memories, such as 3D stacked memory, interposer-based integrated memory, multi-chip modules (MCM), off-chip DRAM on a motherboard, and/or other types of memory. Such system memories may together implement main memory by each implementing a respective subset of the main memory physical address space. The term "system memory" or "main system memory" is used herein to refer to one or more physical memory components of a given type, which are used to implement all or part of a system's main memory address space. The term system memory is therefore distinguished from "cache memory", which does not implement the main memory address space, but rather stores local copies of data stored in a system memory.

Because different memories may be implemented with different technologies and/or in different places in the system, access by a given processor to different memories may be performed with different latency, bandwidth, power consumption, and/or other performance characteristics. For example, a processor may be able to access a portion of memory that is integrated onto that processor using stacked DRAM technology with lower latency and/or power consumption than it can a different portion of memory that is located off-chip (e.g., on the motherboard). As used herein, the term "performance characteristic" refers to any metric of performing an access to a given system memory, such as a latency, bandwidth, or power consumption of performing the access. In some embodiments, a "performance characteristic" may also refer indirectly to such properties, such as by hard-coded priorities.

Traditional prefetching techniques do not consider the different performance characteristics of different memories when making prefetching decisions. Therefore, the prefetching algorithms employed by the requestors are blind to the respective performance characteristics offered by the memory that each request targets. Furthermore, traditional arbiters do not consider these performance characteristics when choosing which prefetching requests to fulfill. Therefore, traditional prefetching techniques may not be optimal for some multi-memory systems.

According to various embodiments, prefetching logic may be configured to consider the relative performance characteristics of different system memories when making prefetching decisions. Such performance characteristics may include latencies, bandwidths, power consumption, and/or other performance characteristics of the different memories targeted by prefetching operations. Accordingly, such prefetching logic may increase performance over traditional prefetching architectures by making prefetching decisions based not only on the probability of using the prefetched data, but also on the relative costs and/or benefits of prefetching that data from different memories.

In various embodiments, the prefetching logic may consider memory performance characteristics at multiple points of the prefetching process. For example, prefetch requestors may be configured to make prefetching requests using algorithms that consider memory performance characteristics (e.g., a requestor may be configured to request larger blocks from slower memory than from faster memory). Likewise, an arbiter may consider memory performance characteristics to determine which requests to fulfill and when (e.g., the arbiter may give preference to requests targeting slower memory).

In various embodiments, the prefetching logic may be configured to optimize for different goals, such as overall performance, lower power consumption, and/or a combination of these and/or other goals. In some embodiments, the prefetching system maybe reconfigurable at runtime to optimize for different goals and/or to balance various system performance interests.

Figure 1A:
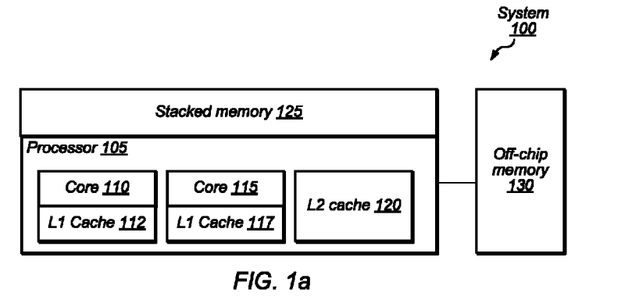
FIG. 1a is a block diagram illustrating a computer system that implements main memory using different memory technologies with different performance characteristics, according to some embodiments.

FIG. 1a is a block diagram illustrating a computer system that implements main memory using different memory technologies with different performance characteristics, according to some embodiments. The illustrated system is intended to provide one example of a system that implements caching and different main memories. However, in various embodiments, the caching techniques described herein may be applied to multi-memory systems with different and/or additional memories and cache structures.

According to FIG. 1a, system 100 includes a multi-core processor 105 that has access to two kinds of main system memory: off-chip memory 130 and stacked memory 125. Off-chip memory 130 may be separate from processor 105. For example, off-chip memory 130 may be implemented as one or more DRAM chips on a motherboard that also hosts processor 105. Thus, processor 105 may access data in memory 130 via a motherboard-provided interconnect. In contrast to off-chip memory 130, stacked memory 125 may be stacked directly on processor 125. For example, stacked memory 125 may be constructed using multiple layers of active silicon bonded with dense, low-latency, high-bandwidth vertical interconnects. Compared to off-chip DRAM, such as 130, stacked memory 125 may significantly reduce wire delays between the processor and memory, thereby offering increased data bandwidth, decreased latency, and/or lower energy requirements. In some embodiments, stacked memory 125 may also include different memory technologies, such as DRAM, SRAM, high-speed CMOS, high-density DRAM, eDRAM, and/or others. Therefore, stacked memory 125 and off-chip memory 130 may offer processor 105 different performance characteristics from one another.

System 100 also includes multiple data caches, which may include caching logic configured to implement prefetching techniques that consider the relative performance characteristics of memories 125 and 130, as described herein. In the illustrated embodiment, processor 105 includes two cores 110 and 115. Each core has access to a respective L1 data cache (i.e., core 110 to L1 cache 112 and core 115 to L1 cache 117) and the two cores share access to a shared L2 data cache 120. The caching logic of caches 112, 117, and/or 120 may be configured to implement prefetching techniques that consider the relative performance characteristics (e.g., latency, bandwidth, power consumption, etc.) of accessing stacked memory 125 versus off-chip memory 130. Although the prefetching mechanism are frequently described herein as being part of a cache itself, these descriptions are not intended to be limiting, and different portions of the prefetching mechanisms may be integrated on a cache, on or off chip, as separate hardware units, and/or in other parts of the system.

In some embodiments, different system memories may offer different processors varied performance characteristics, even when the memories are implemented with the same technologies. For example, in non-uniform memory access (NUMA) systems, a processor may access node-local memory more quickly than the processor can access remote memory implemented on a different node. Thus, the performance characteristics that a processor experiences when accessing a given portion of memory is dependant on the processor's position in the system relative to the memory.

Figure 1B:
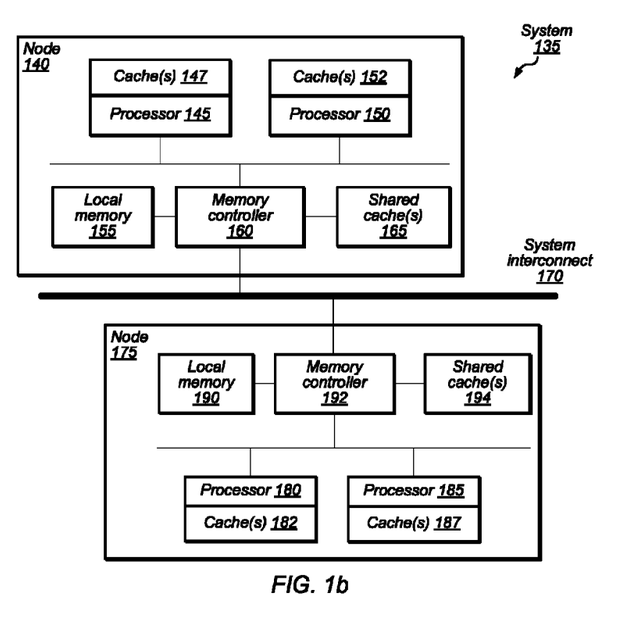
FIG. 1b is a block diagram illustrating some components of an example NUMA system, according to some embodiments.

FIG. 1b is a block diagram illustrating some components of an example NUMA system, according to some embodiments. The illustrated system is intended to provide one example of components in a system that implements caching and main memories that offer different access latencies and/or bandwidths. However, in various embodiments, the caching techniques described herein may be applied to multi-memory systems with different and/or additional memories and cache structures.

System 135 is an example NUMA system that includes two symmetric processing nodes, 140 and 175, connected by a system interconnect 170. Each node includes two processors, a local memory, and various data caches.

System 135 includes multiple processors, each of which may be implemented on a separate chip connected to a respective socket. For example, processors 145 and 150 of node 140 may be implemented as separate chips and connected to one another via an intra-node interconnect, as shown. Any of the processors may include multiple cores on a single chip (e.g., dual-core, quad-core, etc.).

System 135 also includes multiple memories (e.g., 155, 190), each of which may be accessed more quickly by processors on the same node than by processors on a different node. Each memory is usable to store shared memory data accessible by any of the processors. However, a processor on a given node may access local memory on the same node with lower latency, higher bandwidth, and/or less power consumption than it can a remote memory on another node. For example, processor 145 on node 140 may access local memory 155 using only an intra-node interconnect and memory controller 160. However, to access memory 190 on node 175, processor 145 may use the intra-node interconnect of node 140, memory controller 160, system interconnect 170, and memory controller 192. Therefore, access to remote memory may be slower than access to local memory on the same node.

System 135 also includes multiple data caches (e.g., 147, 152, 165, 182, 187, and 194), which may include prefetching mechanisms that account for the different performance characteristics of accessing different memories in the NUMA system. For example, when making prefetching decisions for cache 165, caching logic may consider that access to local memory 155 is faster than access to memory 190 on node 175. Accordingly, in some embodiments, the caching logic may prioritize prefetching of blocks that correspond to remote memory 190 and/or deprioritize prefetching of blocks that correspond to a local memory, such as 155.

Figure 2:
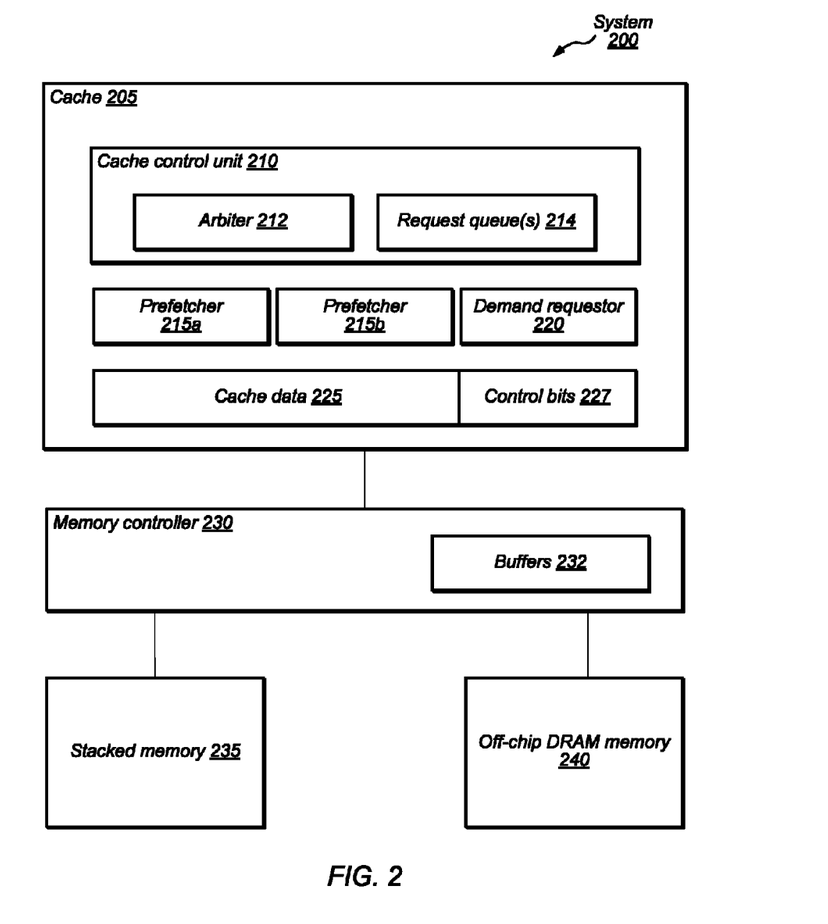
FIG. 2 is a block diagram illustrating various components of a system configured to perform prefetching that considers performance characteristics of two memories, according to some embodiments.

FIG. 2 is a block diagram illustrating various components of a system configured to perform prefetching that considers performance characteristics of two memories, according to some embodiments. System 200 may correspond to system 100 of FIG. 1b, which also includes an off-chip memory and a stacked memory. However, the mechanisms and techniques described below may be adapted to other types of systems, such as system 135 or to other systems with two or more types of memories. In various embodiments, different components illustrated in FIG. 2 may be combined and/or separated further.

System 200 includes data cache 205, which is configured to cache memory data. In different embodiments, cache 205 may be at any different levels of a cache hierarchy. For example, cache 205 may correspond to L1 cache 112, to L2 cache 120, or to another data cache (e.g., L3 cache). In various embodiments, data cache 205 may be implemented on a processor as an on-chip cache or off-chip. Additionally, data cache 205 may be private to a specific processing core or shared among multiple processing cores and/or processors.

Cache 205 may be configured to cache data 225 from two system memories: stacked memory 235 and off-chip DRAM memory 240. Although system 200 includes only two memories of different types, in other embodiments, a system may include more and/or different types of main memories with different performance characteristics. For purposes of illustration, many of the embodiments described herein include a stacked memory and an off-chip DRAM memory, as shown in system 200. However, the reader will appreciate that the techniques described herein may be extended to systems that include an arbitrary number of memories, which may be of various types.

According to the illustrated embodiment, cache 205 includes a cache control unit 210, which may be configured to control cache operations. Cache control unit 210 may include logic configured to decide when to cache various data, to implement an eviction policy, to satisfy queries for data, to arbitrate data fetch requests, and/or to perform other caching functions.

Cache 205 includes three data requestors: prefetcher 215a, prefetcher 215b, and demand requestor 220. Each of the data requestors may send data fetch requests to control unit 210 to request that control unit 210 cache particular memory data specified by the fetch request. For example, demand requestor 220 may be configured to detect that the processor is attempting to access memory data that is not in the cache (i.e., a cache miss), and in response, to request that control unit 210 bring the data into cache. Such a data fetch request may be referred to as a demand request. Prefetchers 215 may be configured to predict that bringing particular memory data into cache will result in a future cache hit and in response, to request that control unit 210 bring the data into cache. Such a data fetch request may be referred to as a prefetch request.

Prefetchers 215 may differ from demand requestor 220 in that prefetchers 215 may make data fetch requests based on predictions of future memory access rather than in response to the certain data demands of the processor. To make such predictions, each prefetcher may implement a respective prediction algorithm. For example, prefetcher 215a may correspond to a next-line prefetcher that detects access to a cache block and in response, automatically requests the next cache block in memory. Meanwhile, prefetcher 215 may correspond to a stride prefetcher that observes repeated access patterns and attempts to extrapolate future memory accesses from the observed patterns.

In various embodiments, system 200 may include fewer, additional, and/or different data requestors. Although system 200 includes two hardware prefetchers (215a and 215b), the system may include any number of software prefetchers configured to implement various prefetching algorithms and make prefetch requests to cache control unit 210. In various embodiments, the system may also include additional and/or fewer hardware prefetchers.

Different prefetchers may employ different, arbitrarily complex algorithms. For example, a prefetching algorithm may request that control unit 210 cache memory data if the algorithm is able to predict, with a sufficient confidence interval, that bringing the data into cache will result in an additional cache hit. The aggressiveness of such an algorithm may be tuned by modifying the threshold for the confidence interval. Various prefetching algorithms may be configured to make predictions using different inputs, such as observed demand requests, cache snoop operations in multi-core systems, write-back operations, other prefetch requests, etc. In some embodiments, the confidence interval may be modified based on whether previously observed predictions were correct. For example, using control bits 227, control unit 210 may mark various blocks in cache data 225 as prefetched and/or accessed. The prefetcher may later observe (e.g., on eviction) whether the prediction was correct and consequently adjust its future predictions.

According to various embodiments, one or more prefetchers (e.g., 215a and 215b) may be configured to implement prefetching algorithms that consider the memory performance characteristics of the memory storing the requested data. In some embodiments, the prefetchers may consider the memory performance characteristics by employing more aggressive prefetching algorithms when targeting slower memory than when targeting faster memory. For example, one prefetcher may request a larger quantity of data when prefetching from a higher-latency memory than from a lower-latency memory. A rationale for such a decision may be to reduce the amortized cost of prefetching data from the higher-latency memory. In another example, the prefetcher may require a lower confidence interval threshold for triggering a prefetch request targeting a slower memory than for triggering one targeting faster memory. A rationale for such a decision may be that the prefetcher should be more aggressive in prefetching from the slower memory because a miss to the slower memory would cause a greater performance penalty than a miss to faster memory. Similarly, a prefetcher may require a higher confidence interval for triggering a prefetch request targeting a high-power memory than for triggering one targeting a low-power memory. A rationale for such a decision may be that the lost energy cost of prefetching from the higher-power memory is greater than that of fetching from the lower power memory. The confidence intervals used for the different memories may be dependent on the respective performance characteristics (e.g., latencies, power consumption) of accessing the different memories.

In response to receiving a data fetch request, cache control unit 210 may place the request in an appropriate request queue, such as one of request queues 214. In some embodiments, the control unit may store different types of requests in separate ones of queues 214. For example, request queues 214 may include a demand queue for storing demand requests and a prefetch queue for storing prefetch requests. In other embodiments, queues 214 may include additional or fewer queues.

Cache control unit 210 includes arbiter 212, which may be configured to choose the next data fetch request for execution from request queue(s) 214. Arbiter 212 may issue the chosen data fetch request to a memory controller, such as 230 for execution. Memory controller 230 may buffer the request in a buffer, such as 232, and then execute the request by accessing the targeted main memory, such as stacked memory 235 or off-chip DRAM 240. A request that has been issued by the arbiter to the memory controller but not yet completed by the memory controller is said to be in flight. In some embodiments, a system may include multiple memory controllers, which may be arranged in different configurations. For example, in some embodiments, different memory controllers may correspond to different main memories and/or may be arranged hierarchically.

When choosing the next data fetch request to execute, arbiter 212 may consider a variety of factors, which may include the respective performance characteristics of different memories. For example, in some embodiments, the arbiter may allow a larger number of in-flight requests to higher-bandwidth memory than to lower-bandwidth memory. A rationale for such a decision may be that a higher-bandwidth memory may be able to handle a larger number of data fetch requests than can a lower-bandwidth memory, without causing undue contention. In another example, the arbiter may give preference to requests that target high-latency memory over those that target low-latency memory. A rationale for such a decision may be to start operations to high-latency memory as quickly as possible so as to minimize experienced latency.

Figure 3:
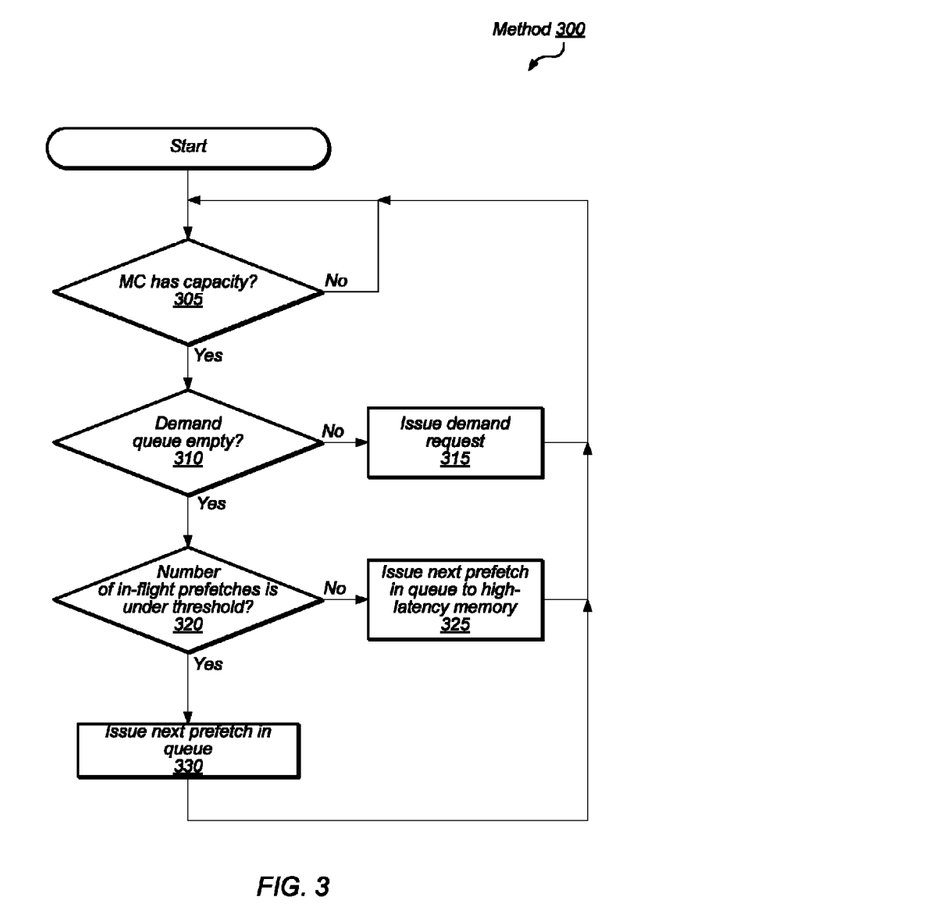
FIG. 3 is a flow diagram illustrating a method for implementing a data fetch request arbiter that considers memory performance characteristics, according to some embodiments.

FIG. 3 is a flow diagram illustrating a method for implementing a data fetch request arbiter that considers memory performance characteristics, according to some embodiments. Method 300 may be executed by an arbiter, such as arbiter 212 of system 200. As illustrated, the arbiter may consider a variety of static and dynamic priorities.

In 305, the arbiter first determines whether the memory controller has capacity to accept another memory access request. For example, a memory controller such as 230 of system 200 may only be able to have N memory requests in flight at the same time. Such a limit may be imposed by the size of request buffers 232 and/or by other factors. If the memory controller does not have capacity to handle another memory access request (as indicated by the negative exit from 305), the arbiter waits (as indicated by the feedback loop from 305).

If the arbiter determines that the memory controller does have capacity for another memory access request (as indicated by the affirmative exit from 305), the arbiter will issue one of the data fetch requests. It is assumed in the illustrated embodiment that the arbiter places demand requests in a demand queue and prefetch requests in a prefetch queue, and that the arbiter gives preference to the demand requests. Therefore, if the demand queue includes a demand request (as indicated by the negative exit from 310), the arbiter issues the demand request to the memory controller, as in 315, and returns to the start of method 300. However, if the demand queue is empty, as indicated by the affirmative exit from 310, the arbiter may consider issuing a prefetch request to the memory controller.

The arbiter may consider relative memory performance characteristics of different memories when choosing the particular prefetch request to issue next. For example, in the illustrated embodiment, the arbiter gives preference to prefetch requests that target high-latency memory (e.g., off-chip DRAM) over those that target low-latency memory (e.g., stacked memory). Specifically, in 320, the arbiter determines whether the number of in-flight prefetches is under a given threshold (e.g., six), which may vary across embodiments. If the number of in-flight prefetches is under the threshold (as indicated by the affirmative exit from 320) the arbiter issues the next prefetch in the queue (as in 330), and returns to the start of method 300. However, if the number of in-flight prefetches is above the threshold (as indicated by the negative exit from 320), the arbiter issues the next prefetch in the queue that targets high-latency memory, as in 325. In 325, the arbiter may issue the prefetch targeting high-latency memory even if another prefetch, which targets low-latency memory, is ahead of the high-latency prefetch in the prefetch queue.

In some embodiments, the arbiter may use different threshold values in 320, depending on the requestor. For example, suppose that prefetcher 215a is a relatively inaccurate next-line prefetcher that makes many requests, few of which result in a cache hit, and that prefetcher 215b is a relatively accurate region prefetcher that makes fewer, but more accurate requests. In this case, allowing prefetcher 215a to make many requests to slow (e.g., high-latency and/or low-bandwidth) memory may be wasteful. Therefore, the arbiter may be configured to allow fewer in-flight prefetches to slow memory from the inaccurate prefetcher 215a than from the more accurate prefetcher 215b.

In various embodiments, the arbiter may use different and/or additional logic to determine the next prefetch to issue. As discussed above, the arbiter may keep track of the number of in-flight prefetches that target each type of memory and allow more in-flight prefetches to high-bandwidth memory than to low-bandwidth memory. Similarly, the arbiter may be configured to lower the system's power consumption by allowing fewer in-flight prefetches that target a high power-consumption memory than to a low power-consumption memory.

In addition to (or instead of) a memory-sensitive arbiter, in some embodiments, one or more prefetchers maybe configured to implement prefetching algorithms that consider different memory performance characteristics. For example, a prefetcher may be configured to adjust its aggressiveness, filter prefetches, and/or otherwise modify its prefetching algorithm based on memory performance characteristics to achieve various system goals.

Figure 4:
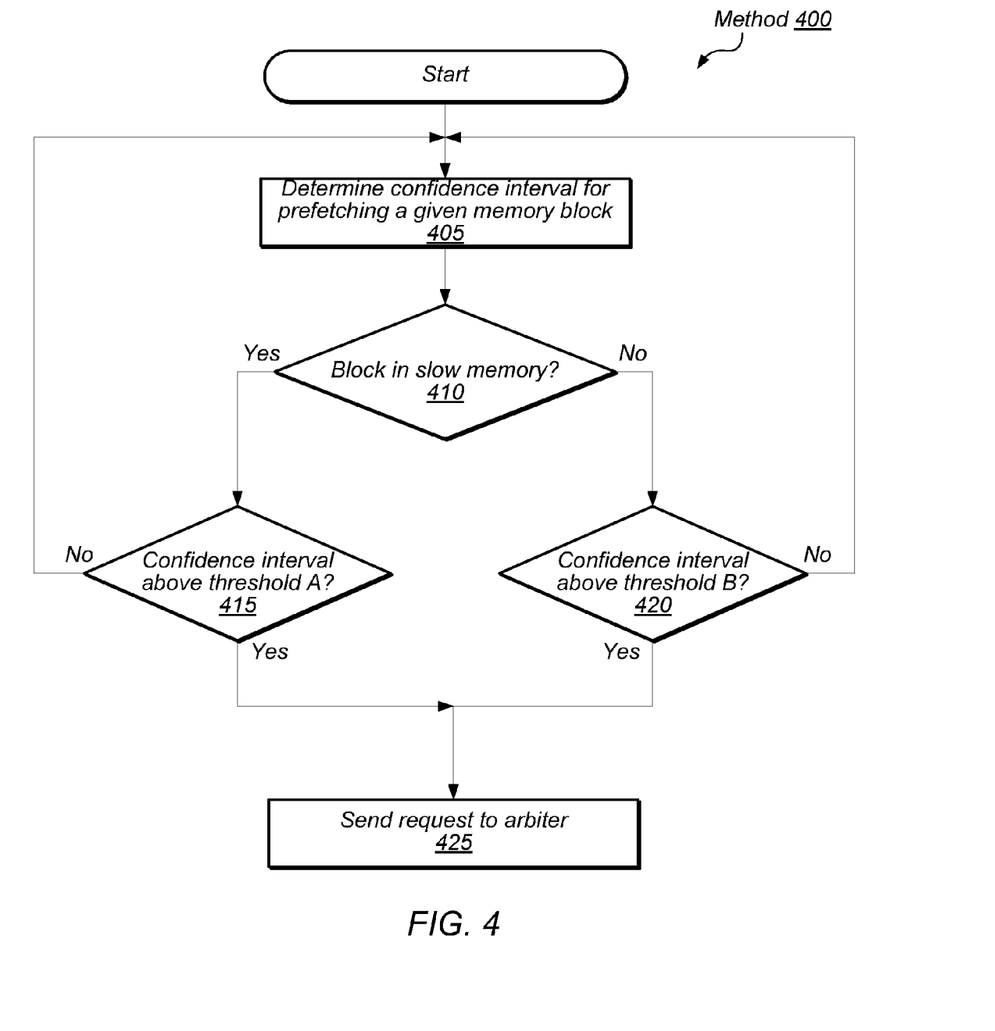
FIG. 4 is a flow diagram illustrating a method for implementing a memory-sensitive prefetching algorithm, according to some embodiments.

FIG. 4 is a flow diagram illustrating a method for implementing a memory-sensitive prefetching algorithm, according to some embodiments. Method 400 of FIG. 4 may be performed by a software or hardware prefetcher, such as prefetcher 215a or 215b of FIG. 2. The method assumes that the system includes two types of memory: a slow memory and a fast memory. Various steps of method 400 may be combined, separated further, and/or performed in a different order to achieve a similar result.

Method 400 begins in 405, where the prefetcher determines a confidence interval for prefetching a given memory block. The confidence interval may be calculated based on observed memory accesses, such as previous demand requests, snoops, write-backs, other prefetches, and/or other memory accesses. Various algorithms may be used to identify a candidate block for prefetching, many of which are known in the art. A prefetcher executing method 400 may identify a candidate block and calculate a confidence interval in 405 using any of these techniques.

In 410, the prefetcher determines if the block is in the slow or fast memory. For example, in system 200, the prefetcher may determine if the memory block is stored in off-chip DRAM 240 (slow memory) or in stacked memory 235 (fast memory). Although method 400 contemplates only two types of memory, the method may be extended to any number of memories by providing additional outcomes to decision 410.

According to the illustrated embodiment, if the block is stored in slow memory, as indicated by the affirmative exit from 410, then the prefetcher measures the confidence interval against a first threshold (A), as in 415. However, if the block is stored in the fast memory, as indicated by the negative exit from 410, then the prefetcher measures the confidence interval against a second threshold (B), as in 420. Thus, the prefetcher determines a different respective confidence threshold for the different memories.

If the confidence interval is above the respective threshold for the memory (as indicated by the affirmative exits from 415 and 420), the prefetcher sends the arbiter a request to prefetch the block, as in 425. However, if the confidence interval is not greater than the respective threshold for the memory (as indicated by the negative exit from 410), the prefetcher does not send the arbiter a request to prefetch the block.

In method 400, the prefetcher may be configured to prefetch blocks from slow memory more aggressively than from fast memory by setting threshold A to be lower than threshold B. As discussed above, a rationale for such a decision may be that the benefit of avoiding a demand request to high-latency memory may be greater than the benefit of avoiding a demand request to low-latency memory.

In variations of method 400, the system may include any number of memories, which may each correspond to a respective threshold. The respective threshold may be chosen in relation to a respective performance characteristics of the memory (e.g., latency) and decision 410 may be modified with respective outputs for each memory type.

While the primary examples have used a mechanism that compares the number of in-flight requests to one or more thresholds, a threshold-based mechanism is just one possible embodiment. Other mechanisms could include available bandwidth, or average bandwidth utilization over the most recent N cycles, the recent accuracy or usefulness of prefetches, or any combination of methods. In any of these, the knowledge that a prefetch targets one type of memory or the other can be exploited to create different responses to improve performance or some other objective compared to a conventional approach that did not exploit the differences in the performance characteristics of the memories.

Although method 400 optimizes for performance, in variations, the prefetcher may optimize for other system characteristics, such as power consumption. For example, decision 410 may be modified to choose a respective threshold based on the respective power consumption of different memories. To reduce power consumption, the prefetcher may prefetch less aggressively from a memory that consumes more power than from one that consumes less.

In another variation, the prefetcher may prefetch blocks from slow memory more aggressively by varying other parameters of the prefetch algorithm. For example, rather than (or in addition to) using different confidence interval thresholds for each memory, the prefetcher may use different respective prefetch degrees (i.e., amount of data to prefetch). Generally, the prefetcher may even apply different prefetching algorithms to different memories. For example, in response to a memory access, a next-line prefetcher may be configured to always fetch the next block if the access was to slow memory, but to prefetch the next line from fast memory only if the memory access was a cache miss (prefetch on miss), was accessed for the first time (tagged prefetch), and/or some other conditions apply.

In some embodiments, the prefetching architecture may be configurable by software to implement different goals. For example, if an operating system (OS) executing on a laptop computer or other mobile device detects that the device is plugged into a power source, the OS may configure the prefetching architecture to optimize for performance (e.g., prefetch more aggressively from slow memory). In contrast, if the device is operating on battery power, the OS may configure the device to optimize for lower power consumption (e.g., prefetch less aggressively from high-power memory). In some embodiments, the cache may include any number of software accessible flags that may enable the OS to configure the prefetching architecture to optimize for different goals.

Figure 5:
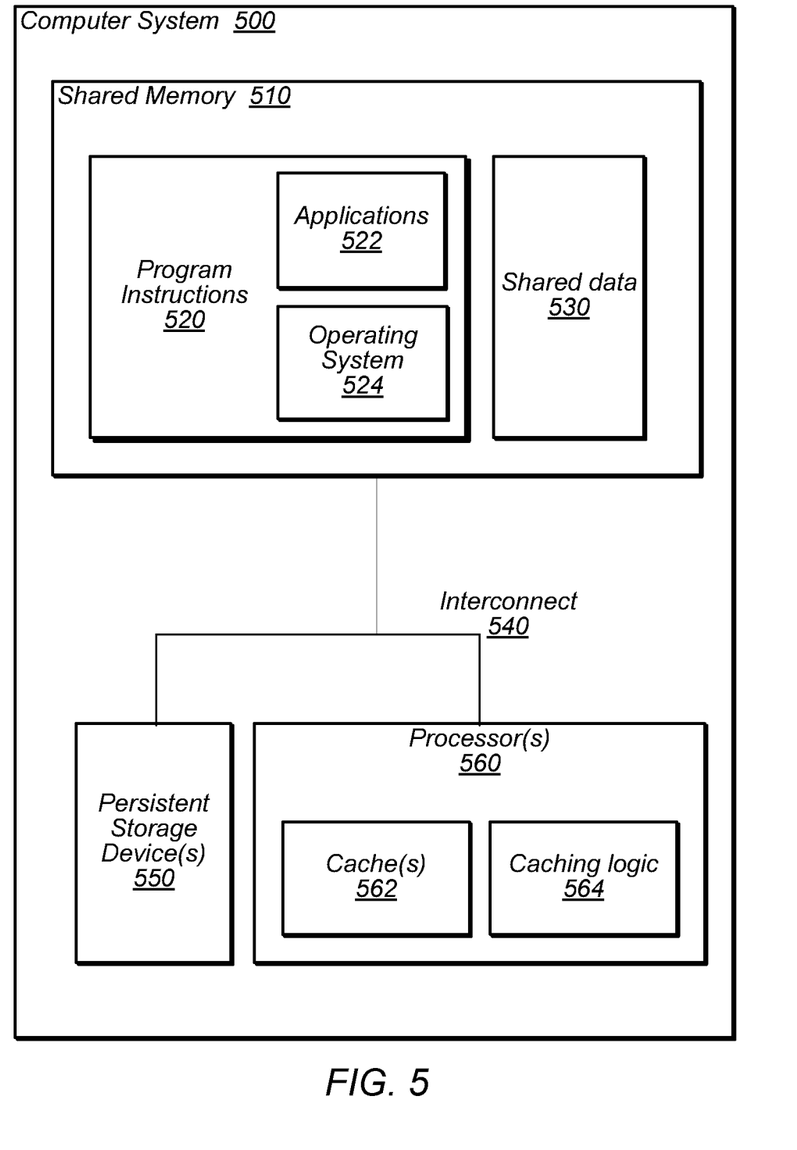
FIG. 5 is a block diagram illustrating a computer system configured to employ memory-sensitive prefetching as described herein, according to some embodiments.

FIG. 5 is a block diagram illustrating a computer system configured to employ memory-sensitive prefetching as described herein, according to some embodiments. The computer system 500 may correspond to any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

Computer system 500 may include one or more processors 560, any of which may include multiple physical and/or logical cores. Any of processors 560 may correspond to processor 105 of FIG. 1a and may include data caches, such as caches 562. Caches 562 may include multiple caches at different levels of a cache hierarchy, as described herein. For example, caches 562 may correspond to L1 caches 112 and 117, L2 cache 120, and/or to other caches. Caches 562 may also include caching logic, such as 564, that is configured to implement memory-sensitive prefetching, as described herein. Computer system 500 may also include one or more persistent storage devices 550 (e.g. optical storage, magnetic storage, hard drive, tape drive, solid state memory, etc), which may persistently store data.

According to the illustrated embodiment, computer system 500 includes one or more shared memories 510 (e.g., one or more of cache, SRAM, DRAM, stacked memory, RDRAM, EDO RAM, DDR RAM, SDRAM, Rambus RAM, EEPROM, etc.), which may be shared between multiple processing cores, such as on one or more of processors 560. In some embodiments, different ones of processors 560 may be configured to access shared memory 510 with different latencies. In some embodiments, shared memory 510 may include multiple different types of memories, various ones of which may be capable of accessing memory at different speeds.

The one or more processors 560, the storage device(s) 550, and shared memory 510 may be coupled via interconnect 540. In various embodiments, the system may include fewer or additional components not illustrated in FIG. 5 (e.g., video cards, audio cards, additional network interfaces, peripheral devices, a network interface such as an ATM interface, an Ethernet interface, a Frame Relay interface, monitors, keyboards, speakers, etc.). Additionally, different components illustrated in FIG. 5 may be combined or separated further into additional components.

In some embodiments, shared memory 510 may store program instructions 520, which may be encoded in platform native binary, any interpreted language such as Java™ bytecode, or in any other language such as C/C++, Java™, etc. or in any combination thereof. Program instructions 520 may include program instructions to implement one or more applications 522, any of which may be multi-threaded. In some embodiments, program instructions 520 may also include instructions executable to implement an operating system 524, which may provide software support to applications 522, such as scheduling, software signal handling, etc.

According to the illustrated embodiment, shared memory 510 includes shared data 530, which may be accessed by one or more of processors 560 and/or various processing cores thereof at different latencies and/or bandwidths. Ones of processors 560 may cache various components of shared data 530 in local caches (e.g., 562) as described herein, and coordinate the data in these caches by exchanging messages according to a cache coherence protocol. In some embodiments, multiple ones of processors 560 and/or multiple processing cores of processors 560 may share access to caches 562 and/or off-chip caches.

Program instructions 520, such as those used to implement applications 522 and/or operating system 524, may be stored on a computer-readable storage medium. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions.

A computer-readable storage medium as described above may be used in some embodiments to store instructions read by a program and used, directly or indirectly, to fabricate hardware comprising one or more of processors 560. For example, the instructions may describe one or more data structures describing a behavioral-level or register-transfer level (RTL) description of the hardware functionality in a high level design language (HDL) such as Verilog or VHDL. The description may be read by a synthesis tool, which may synthesize the description to produce a netlist. The netlist may comprise a set of gates (e.g., defined in a synthesis library), which represent the functionality of processor 500. The netlist may then be placed and routed to produce a data set describing geometric shapes to be applied to masks. The masks may then be used in various semiconductor fabrication steps to produce a semiconductor circuit or circuits corresponding to processors 50 and/or 560. Alternatively, the database may be the netlist (with or without the synthesis library) or the data set, as desired.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a processor configured to access a plurality of system memories with different respective performance characteristics, wherein each of the plurality of system memories stores a respective non-overlapping subset of system memory data; and
caching logic configured to determine a portion of the system memory data to prefetch into a data cache based on one or more of the respective performance characteristics of the system memory that stores the portion of the system memory data;
wherein the caching logic includes an arbiter configured to:
receive prefetch requests targeting respective ones of the system memories;
determine a next one of the requests to issue to a memory controller for execution, wherein the determining is dependent on the one or more respective performance characteristics of the system memory targeted by the determined next one of the requests; and
permit more in-flight prefetch requests targeting a high-latency one of the system memories than in-flight prefetch requests targeting a low-latency one of the system memories.

2. The apparatus of claim 1, wherein the caching logic is configured to determine the portion of system memory to be prefetched into the data cache based on respective physical locations of the plurality of system memories within the apparatus.

3. The apparatus of claim 1, wherein the caching logic is configured to determine the portion of system memory to be prefetched into the data cache based on respective memory technologies used to implement ones of the plurality of system memories.

4. The apparatus of claim 1, wherein the one or more performance characteristics include at least one of: latency, bandwidth, and power consumption.

5. The apparatus of claim 1, wherein the arbiter is configured to permit more in-flight prefetch requests targeting a high-bandwidth one of the system memories than in-flight prefetch requests targeting a low-bandwidth one of the system memories.

6. The apparatus of claim 1, wherein the caching logic comprises a prefetcher configured to make prefetch requests according to a prefetching algorithm that is dependent on the respective performance characteristics of the plurality of system memories.

7. The apparatus of claim 6, wherein the algorithm makes prefetch requests targeting a high-latency one of the system memories more aggressively than the algorithm makes prefetch requests targeting a low-latency one of the system memories.

8. The apparatus of claim 7, wherein making prefetch requests targeting a high-latency one of the system memories more aggressively comprises triggering prefetch requests targeting the high-latency memory using a lower confidence threshold and triggering prefetch requests targeting the low-latency memory using a higher confidence threshold.

9. A method comprising:
caching logic determining a portion of system memory data to prefetch from one of a plurality of system memories, wherein:
one or more of the system memories have different respective performance characteristics;
each of the system memories stores a respective subset of system memory data and each of the system memories is at a same level in a memory hierarchy; and
determining the portion of data to prefetch is based on one or more of the respective performance characteristics of the system memory that stores the portion of the system memory data;
an arbiter receiving prefetch requests targeting respective ones of the system memories;
the arbiter determining a next one of the requests to issue to a memory controller for execution, wherein the determining is dependent on the one or more respective performance characteristics of the system memory targeted by the determined next one of the requests; and
the arbiter permitting more in-flight prefetch requests targeting a high-bandwidth one of the system memories than in-flight prefetch requests targeting a low-bandwidth one of the system memories.

10. The method of claim 9, wherein the different respective performance characteristics are based on respective physical locations of the plurality of system memories within a system.

11. The method of claim 9, wherein the different respective performance characteristics are based on respective memory technologies used to implement ones of the plurality of system memories.

12. The method of claim 9, wherein the one or more performance characteristics include at least one of: latency, bandwidth, and power consumption.

13. The method of claim 9, further comprising: a prefetcher making prefetch requests according to a prefetching algorithm that is dependent on the respective performance characteristics of the plurality of system memories.

14. The method of claim 13, wherein the algorithm makes prefetch requests targeting a high-latency one of the system memories more aggressively than the algorithm makes prefetch requests targeting a low-latency one of the system memories.

15. A computer readable non-transitory storage medium comprising a data structure which is operated upon by a program executable on a computer system, the program operating on the data structure to perform a portion of a process to fabricate an integrated circuit including circuitry described by the data structure, the circuitry described in the data structure including:
a processor configured to access a plurality of system memories with different respective performance characteristics, wherein each memory stores a respective non-overlapping subset of system memory data; and
caching logic configured to determine a portion of the system memory data to prefetch into a data cache based on one or more of performance characteristics of the system memory that stores the portion of the system memory data wherein the caching logic includes a prefetcher configured to make prefetch requests according to a prefetching algorithm that is dependent on the respective performance characteristics of the plurality of system memories;

wherein the algorithm makes prefetch requests targeting a high-latency one of the system memories more aggressively than the algorithm makes prefetch requests targeting a low-latency one of the system memories; and wherein making prefetch requests targeting a high-latency one of the system memories more aggressively comprises triggering prefetch requests targeting the high-latency memory using a lower confidence threshold and triggering prefetch requests targeting the low-latency memory using a higher confidence threshold.

16. The computer readable non-transitory storage medium of claim 15, wherein the storage medium stores HDL, Verilog, or GDSII data.

17. The computer readable non-transitory storage medium of claim 15, wherein the caching logic is configured to determine the portion of system memory to be prefetched into the data cache based on respective physical locations of the plurality of system memories within the apparatus or based on respective memory technologies used to implement ones of the plurality of system memories.

* * * * *